(12) United States Patent
Yashima et al.

(10) Patent No.: US 8,366,071 B2
(45) Date of Patent: Feb. 5, 2013

(54) SLIDING MEMBER, MECHANICAL SEAL RING, MECHANICAL SEAL AND FAUCET VALVE

(75) Inventors: Mieko Yashima, Kirishima (JP); Yuusaku Ishimine, Kirishima (JP)

(73) Assignee: Kyocera Corporation, Kyoto (JP)

( * ) Notice: Subject to any disclaimer, the term of this patent is extended or adjusted under 35 U.S.C. 154(b) by 377 days.

(21) Appl. No.: 12/745,516

(22) PCT Filed: Nov. 28, 2008

(86) PCT No.: PCT/JP2008/071731
§ 371 (c)(1),
(2), (4) Date: Sep. 2, 2010

(87) PCT Pub. No.: WO2009/069787
PCT Pub. Date: Jun. 4, 2009

(65) Prior Publication Data
US 2010/0327204 A1 Dec. 30, 2010

(30) Foreign Application Priority Data

Nov. 29, 2007 (JP) .................................. 2007-308685
Feb. 27, 2008 (JP) .................................. 2008-045560

(51) Int. Cl.
*F16K 51/00* (2006.01)
(52) U.S. Cl. .......... 251/214; 251/368; 501/88; 501/153; 501/154
(58) Field of Classification Search .................. 251/214, 251/368; 501/88–89, 153–154
See application file for complete search history.

(56) References Cited

U.S. PATENT DOCUMENTS

| | | | |
|---|---|---|---|
| 4,932,438 A * | 6/1990 | Kitamura et al. | 251/368 |
| 5,007,615 A * | 4/1991 | Kernion et al. | 251/368 |
| 5,688,728 A * | 11/1997 | Niwa et al. | 501/88 |
| 5,887,620 A * | 3/1999 | Niwa et al. | 251/368 |
| 6,089,843 A * | 7/2000 | Kondoh | 251/368 |
| 6,904,935 B2 * | 6/2005 | Welty et al. | 251/368 |

FOREIGN PATENT DOCUMENTS

| | | |
|---|---|---|
| JP | 07033550 A | 2/1995 |
| JP | 07242974 A | 9/1995 |
| JP | 09310765 A | 12/1997 |
| JP | 2002147617 A | 5/2002 |
| JP | 2002274953 A | 9/2002 |
| JP | 3481774 B | 12/2003 |
| JP | 2007119338 A | 5/2007 |

* cited by examiner

OTHER PUBLICATIONS

International Search Report for corresponding PCT application PCT/JP2008/071731 lists the references above.

*Primary Examiner* — John Bastianelli
(74) *Attorney, Agent, or Firm* — DLA Piper LLP (US)

(57) ABSTRACT

Provided is a sliding member which includes a plurality of open pores in a sliding surface, which each comprises one or more opening portions having a circularity of 0.24 or more and a circle equivalent diameter of 10 μm to 150 μm. A ratio of the number of open pores having the overlapping degree of 10% or more between the opening portions is 3% or less. Another sliding member includes a plurality of open pores in a sliding surface, which each comprises one or more opening portions having a circularity of 0.24 or more and a circle equivalent diameter of not less than 10 μm nor more than 78 μm. A coefficient of variation of the opening portions satisfies the following equation: $1.03 \leq \sqrt{V}/X \leq 1.51$ where $\sqrt{V}$ is a standard deviation of circle equivalent diameters, and X is an average value of the circle equivalent diameters. A mechanical seal ring, a mechanical seal and a faucet valve each using the sliding member are also provided.

7 Claims, 6 Drawing Sheets

SLIDING MEMBER, MECHANICAL SEAL RING, MECHANICAL SEAL AND FAUCET VALVE

CROSS-REFERENCE TO THE RELATED APPLICATIONS

This application is a national stage of international application No. PCT/JP2008/071731, filed on Nov. 28, 2008 and claims the benefit of priority under 35 USC 119 to Japanese Patent Application No. 2007-308685, filed on Nov. 29, 2007 and Japanese Patent Application No. 2008-045560, filed on Feb. 27, 2008, the entire contents of which are incorporated herein by reference.

TECHNICAL FIELD

The present invention relates to a sliding member. The present invention also relates to a mechanical seal ring used in mechanical seals of pumps for fish holding tanks, automobile cooling water pumps, and the like, and a mechanical seal including the mechanical seal ring. The present invention further relates to faucet valves such as a water faucet valve, a hot water faucet valve, and hot and cold water mixing faucet valve.

BACKGROUND ART

A sliding member using a ceramic sintered body is being applied by utilizing its wear resistance to mechanical seal rings used in, for example, the mechanical seals of fluid equipments. The mechanical seal is aimed to completely seal fluid and is one of shaft sealing devices used in the rotating parts of various types of machines. The mechanical seal ring is made up of a rotary ring that slidingly contacts the rotating parts of the various types of machines and is movable in the axial direction in accordance with the wear of a sliding surface, and a stationary ring being immovable. The mechanical seal ring operates to restrict the fluid leakage at an end face substantially vertical to a relatively rotating shaft.

As a material constituting the mechanical seal ring, a carbon material, cemented carbide, a silicon carbide sintered body or an alumina sintered body is used mainly. In the recent years, the alumina sintered body or the silicon carbide sintered body which has high hardness and high corrosion resistance and also has a low coefficient of friction and excellent smoothness during sliding is often used.

Japanese Unexamined Patent Application Publication No. 7-33550 describes a mechanical seal member containing a silicon carbide sintered body having predetermined pores. This document also describes that these pores have a porosity of 2 to 12% by volume and have a spherical shape, and they are uniformly distributed into the sintered body and have a mean diameter (a mean pore diameter) of 50 to 500 μm.

Japanese Unexamined Patent Application Publication No. 2002-274953 describes a sliding body formed by a silicon carbide sintered material in which porous silicon carbide structures having fine pores are independently and dispersedly arranged in a dense silicon carbide structure, and a mechanical seal composed of the sliding body. FIG. 11 is a micrograph showing the pores existing in the sliding body. The portions looked like black in FIG. 11 are the pores. The coefficient of variation obtained from the average value of the circle equivalent diameters of portions where the pores appearing in the micrograph are opened (hereinafter referred to as opening portions), and the standard deviation thereof is approximately 0.79.

Japanese Unexamined Patent Application Publication No. 2002-147617 describes a mechanical seal that one or both of two seal rings rotating and slidingly contacting with each other are formed by a silicon carbide sintered material in which independent pores having a mean pore diameter of 10 to 40 μm are uniformly arranged, and the porosity thereof is 3 to 10%. FIG. 12 is a micrograph showing the pores existing in the seal rings constituting the mechanical seal. The portions looked like black in FIG. 12 are the pores. The coefficient of variation obtained from the average value of the circle equivalent diameter of opening portions of the pores appearing in the micrograph, and the standard deviation thereof is approximately 0.85.

Each of the above sliding members has a low coefficient of friction and has excellent smoothness during sliding. Hence, they may be suitably used for mechanical seal rings and other sliding members in a relatively short term.

However, the mechanical seal member described in Japanese Unexamined Patent Application Publication No. 7-33550 is low in the product (PV value) of a sliding surface pressure (P) and the circumferential speed (V) of the sliding surface, which is the index indicating the performance of a mechanical seal, and the mean pore diameter thereof is as large as 50 to 500 μm. Although needless to say when the pores having such a large mean pore diameter exist independently on the sliding surface, if the pores exist in mutual connection relationship on the sliding surfaces, it seems to be difficult to maintain sealing properties for a long term.

In the sliding body described in Japanese Unexamined Patent Application Publication No. 2002-274953, pre-granules obtained by granulating silicon carbide powder for a porous sintered body containing no sintering additives are granulated by merely mixing silicon carbide powder for a dense sintered body. The pores are therefore partially aggregated as apparent from FIG. 11, and it seems difficult to maintain sealing properties for a long term.

In the mechanical seal described in Japanese Unexamined Patent Application Publication No. 2002-147617, a pore forming agent, such as polystyrene, for forming pores is added to raw material powder. However, the pore forming agent is susceptible to aggregation. As apparent from FIG. 12, this increases the ratio of interconnected pores in which a plurality of pores are connected to each other to form a long slender shape having a large maximum diameter. Consequently, a long-term continuous use of the mechanical seal seems to deteriorate sealing properties because during sliding, stress concentrates at the peripheral portions of the contour forming the interconnected pores, thus being susceptible to degranulation.

DISCLOSURE OF THE INVENTION

An advantage of the present invention is to provide a sliding member, a mechanical seal ring, a mechanical seal and a faucet valve which are capable of maintaining satisfactory sealing properties even in their long-term continuous use.

The sliding member according to a first aspect of the present invention includes a plurality of open pores in a sliding surface, which each comprises one or more opening portions having a circularity of 0.24 or more and a circle equivalent diameter of not less than 10 μm nor more than 150 μm. A ratio of the number of open pores having the overlapping degree of 10% or more between the opening portions is 3% or less.

The sliding member according to a second aspect of the present invention includes a plurality of open pores in a sliding surface, which each comprises one or more opening portions having a circularity of 0.24 or more and a circle equivalent diameter of not less than 10 μm nor more than 78 μm. A coefficient of variation of the opening portions satisfies the following equation:

$$1.03 \leq \sqrt{V}/X \leq 1.51$$

where $\sqrt{V}$ is a standard deviation of circle equivalent diameters, and X is an average value of the circle equivalent diameters.

The mechanical seal ring according to a third aspect of the present invention includes a stationary ring and a rotary ring. A sliding surface of the stationary ring and a sliding surface of the rotary ring are mutually contacted, and at least one of the stationary ring and the rotary ring is formed by the sliding member according to the first aspect.

The mechanical seal ring according to a fourth aspect of the present invention includes a stationary ring and a rotary ring. A sliding surface of the stationary ring and a sliding surface of the rotary ring are mutually contacted, and at least one of the stationary ring and the rotary ring is formed by the sliding member according to the second aspect.

The mechanical seal according to a fifth aspect of the present invention includes the mechanical seal ring according to the third aspect, and a rotary shaft that is inserted onto an inner peripheral side of the mechanical seal ring and is configured to transmit a driving force.

The mechanical seal according to a sixth aspect of the present invention includes the mechanical seal ring according to the fourth aspect, and a rotary shaft that is inserted onto an inner peripheral side of the mechanical seal ring and is configured to transmit a driving force.

The faucet valve according to a seventh aspect of the present invention includes a stationary valve body and a rotary valve body. A sliding surface of the stationary valve body and a sliding surface of the rotary valve body are mutually contacted, and at least one of the stationary valve body and the rotary valve body is formed by the sliding member according to the first aspect.

The faucet valve according to an eighth aspect of the present invention includes a stationary valve body and a rotary valve body. A sliding surface of the stationary valve body and a sliding surface of the rotary valve body are mutually contacted, and at least one of the stationary valve body and the rotary valve body is formed by the sliding member according to the second aspect.

The sliding member according to the first or second aspect, the mechanical seal ring according to the third or fourth aspect, the mechanical seal according to the fifth or sixth aspect, and the faucet valve according to the seventh or eighth aspect are capable of maintaining satisfactory sealing properties even in their long-term continuous use.

Figure 1:
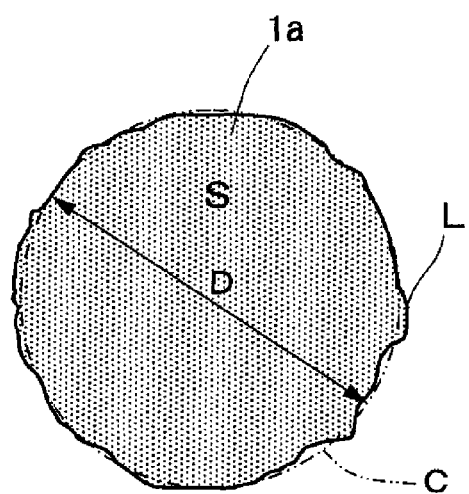
FIG. 1 is a plan view schematically explaining the relationship between an opening portion existing in a sliding member according to a preferred embodiment of the invention and a circle having the same area as the opening portion.
Figure 2:
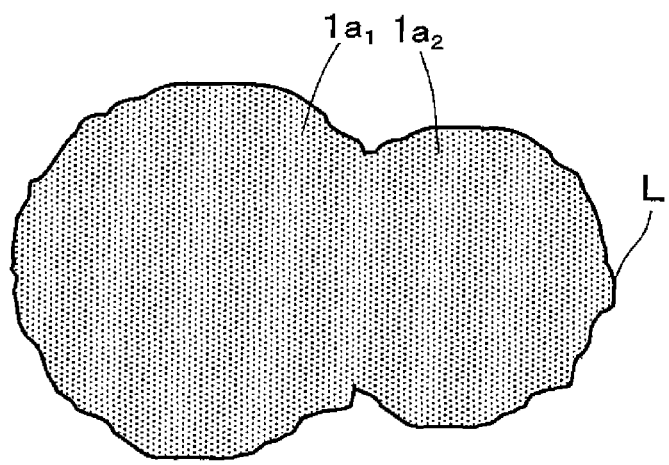
FIG. 2 is a plan view schematically explaining open pores, whose adjacent opening portions are overlapped with each other, existing in the sliding member of the preferred embodiment of the invention.

| Description of Reference Numerals | |
| --- | --- |
| 1a: | opening portion |
| 1b: | remaining pore |
| 1c: | burnt-down pore |
| 2: | main phase |
| 3: | sub phase |
| 4: | silicon carbide sintered body |
| 5: | mechanical seal ring |
| 5a: | stationary ring |
| 5b: | rotary ring |
| 6: | rotary shaft |
| 7: | casing |
| 8: | packing |
| 9: | coil spring |
| 10: | collar |
| 11: | set screw |
| 12: | shock absorbing rubber |
| 13: | O-ring |
| 14: | sealing fluid |
| 15a, 15b: | sliding surface |
| 16: | faucet valve |
| 17: | stationary valve body |
| 18: | movable valve body |
| 17a, 18a: | sliding surface |
| 17b, 18b: | fluid passage |

PREFERRED MODE FOR CARRYING OUT THE INVENTION

<Sliding Member>

A preferred embodiment of the present invention will be described below in detail with reference to FIGS. 1 to 6. The sliding member of the present preferred embodiment has a sliding surface. The sliding surface has a plurality of open pores. It is constructed so that these open pores are previously filled with a lubricant for improving sliding characteristics and the lubricant is supplied to the sliding surface during sliding. The term "sliding surface" as used in the present preferred embodiment means surfaces where the sliding members abut and rub with each other. Besides the sliding surfaces in the initial state thereof, any surface newly appeared due to wear during sliding is also included as the sliding surface.

The above open pores in the sliding member of the present preferred embodiment have one or more opening portions $1a$ whose circularity is 0.24 or more and circle equivalent diameter is not less than 10 μm nor more than 150 μm, as shown in FIG. 1. The ratio of the number of open pores having not less than 10% of the degree of overlap between the opening portions $1a$ to the plurality of open pores is not more than 3%.

The circularity of the opening portions $1a$ is the index indicating circlelike shape of the opening portion $1a$, and defined as shown in the following equation (1). The range of the circularity of the opening portion $1a$ is not less than 0 nor more than 1. The opening portion $1a$ is closer to a perfect circle as the circularity value increases.

$$\text{Circularity } (a) \text{ of opening portion } 1a = (4 \times \pi \times S)/(L)^2 \quad (1)$$

where π is the ratio of the circumference of a circle to its diameter (This is taken here to be 3.14 and interpreted in the same way hereafter.); S is the area of the opening portion $1a$ (unit: μm$^2$); and L is the circumferential length of the opening portion $1a$ (unit: μm).

The circle equivalent diameter of an opening portion $1a$ means a diameter D of a circle C when the opening portion $1a$ is replaced with the circle C having the same area as the opening portion $1a$, and is defined as shown in the following equation (2).

$$\text{circle equivalent diameter } (\phi) \text{ of an opening portion } 1a = \sqrt{(4 \times S/\pi)} \quad (2)$$

The opening portion whose circularity is 0.24 or more and circle equivalent diameter is not less than 10 μm nor more than 150 μm means an opening portion that is close to the perfect circle and not extremely large. That is, the sliding member of the present preferred embodiment includes in the sliding surface a relatively small opening portion $1a$ being close to the perfect circle. By setting the circularity of the opening portion $1a$ to not less than 0.24, the deterioration of sealing properties due to degranulation occurred from the circumference of the opening portion $1a$ during sliding can be reduced, and damage to the sliding member to be abutted can be decreased. Additionally, the deterioration of sealing properties due to the largeness of the opening portion $1a$ can be reduced by setting the circle equivalent diameter of the opening portion $1a$ to not more than 150 μm.

Figure 3:
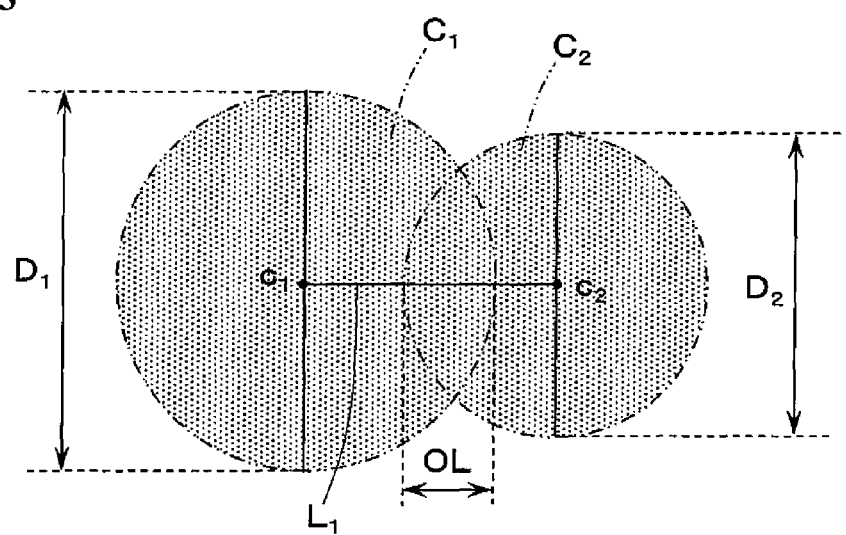
FIG. 3 is an explanatory drawing showing the situation where circles having the same areas as the opening portions existing in the sliding member of the preferred embodiment of the invention are overlapped with each other.

The degree of overlap between the opening portions $1a$ is the index indicating the degree of overlap between the adjacent opening portions $1a_1$ and $1a_2$, and it is defined as shown in the following equation (3) in the following manner. That is, the opening portions $1a_1$ and $1a_2$ are replaced by image analysis with circles $C_1$ and $C_2$ of identical area to those of these opening portions, respectively, as shown in FIG. 3. The range of the degree of overlap is not less than 0% nor more than 90%. As the value thereof becomes smaller, the overlap area becomes smaller and the area of the entire opening portions becomes larger.

$$\text{Degree of overlap } (b) \text{ between the opening portions } 1a_1 \text{ and } 1a_2 = (OL/D_2) \times 100 \quad (3)$$

where OL is the length of portions where the opening portions $1a_1$ and $1a_2$ are overlapped with each other in a line $L_1$ connecting the centers $c_1$ and $c_2$ of the circles $C_1$ and $C_2$; and $D_2$ is the diameter of the circle $C_2$ that is smaller (Although the diameter of the smaller circle corresponds to $D_2$ in FIG. 3, it may correspond to $D_1$ in some cases. Namely, the diameter of a smaller circle in the circles $C_1$ and $C_2$ is employed depending on the form.).

The open pores in which the degree of overlap is not less than 10% mean the open pores having not less than 10% of the degree of overlap, and having a plurality of the opening portions $1a$. The number of the opening portions $1a$ included in the open pores is usually about 2 to 4 pieces. The entire area of the opening portions is restricted by setting the degree of overlap to not less than 10%. The ratio of the open pores having the opening portions $1a$ having a small area which apparently exist solely in the sliding surface is increased by setting the ratio of the number of open pores in which the degree of overlap is not less than 10% among a plurality of open pores, to not more than 3%. Therefore, the sealing properties and the retainability of a lubricating liquid can be maintained even in a long-term continuous use. The ratio of the number of the open pores in which the degree of overlap is not less than 10% is more preferably not less than 1% nor more than 2.4%. This further enhances the sealing properties in the sliding surface.

To obtain the circularity (a) of the opening portions, the circle equivalent diameter (φ) of the opening portions, and the degree of overlap (b) between the opening portions, and the ratio of the number of the open pores as described above, firstly, the sliding surface after being ground by using polishing abrasive grains is observed with an industrial microscope. As the polishing abrasive grains, for example, diamond abrasive grains having a mean particle diameter of 1 to 3 μm may be used.

Images are acquired at ×50 magnification with the industrial microscope by taking photographs of four regions, each of which is set to 2471 μm×1853 μm as a measuring area selected from the sliding surface. These images are then analyzed with image analysis software. As the image analysis software, for example, "A-zo-kun" (Trademark) available from Asahi Kasei Engineering Corporation is used, and the technique of circular particle analysis is applied.

The number of the open pores having one or more opening portions $1a$ whose circularity is not less than 0.24 and circle equivalent diameter is not less than 10 μm nor more than 150 μm is obtained through the analysis using the image analysis software with respect to the images acquired by individually designating and taking photographs of the four regions, each of which is set to 2471 μm×1853 μm as the measuring area selected from the sliding surface.

The sliding member of the present preferred embodiment is affected by the average value of the circle equivalent diameters of the opening portions $1a$ in terms of the retainability of the lubricating liquid and sealing properties. When the average value of the circle equivalent diameters of the opening portions $1a$ is large, the open pores are large. Consequently, the retainability of the lubricating liquid is enhanced, whereas the sealing properties is lowered. On the other hand, when the average value of the circle equivalent diameters of the opening portions $1a$ is small, the open pores are small. Consequently, the sealing properties is enhanced, whereas the retainability of the lubricating liquid is lowered.

In view of the foregoing, in the sliding member of the present preferred embodiment, the average value of the circle equivalent diameters of the opening portions $1a$ is preferably not less than 20 μm nor more than 40 μm. This enhances the retainability of the used lubricating liquid, and also maintains high sealing properties. Further, the average value of the circle equivalent diameters of the opening portions $1a$ is more preferably not less than 20 μm nor more than 30 μm.

Similarly, the average value of the circle equivalent diameters is obtained through the analysis using the image analysis software with respect to the images acquired at ×50 magnification with the industrial microscope by individually designating and taking photographs of four regions, each of which is set to 2471 µm×1853 µm as a measuring area selected from the sliding surface.

The ratio of the open pores is preferably not less than 1% nor more than 2.4%. This ratio is adjustable by the ratio of a later-described pore forming agent, or the like. This ratio is obtained through analysis using the industrial microscope and the image analysis software in the same manner as described above. In the case of the analysis using the image analysis software, it may be set so that the open pores having an circle equivalent diameter of less than 10 µm are previously removed from the object of analysis.

On the other hand, the sliding surface is composed of ceramics such as silicon carbide, silicon nitride, sialon, silicon carbon nitride, titanium carbide, aluminum oxide, or zirconium oxide. The sliding surface is particularly preferably composed of aluminum oxide or silicon carbide. Aluminum oxide and silicon carbide have high hardness and high corrosion resistance and also have a low coefficient of friction and excellent smoothness during sliding. Hence, when the sliding surface is composed of aluminum oxide or silicon carbide, the sliding characteristics thereof can be enhanced.

Alternatively, the sliding surface may be those in which a film using aluminum oxide or silicon carbide as its main ingredient may be formed on the surface of a ceramic sintered body. The term "main ingredient" means a certain ingredient whose amount is not less than 50% by mass of the total ingredients constituting the film.

Figure 4:
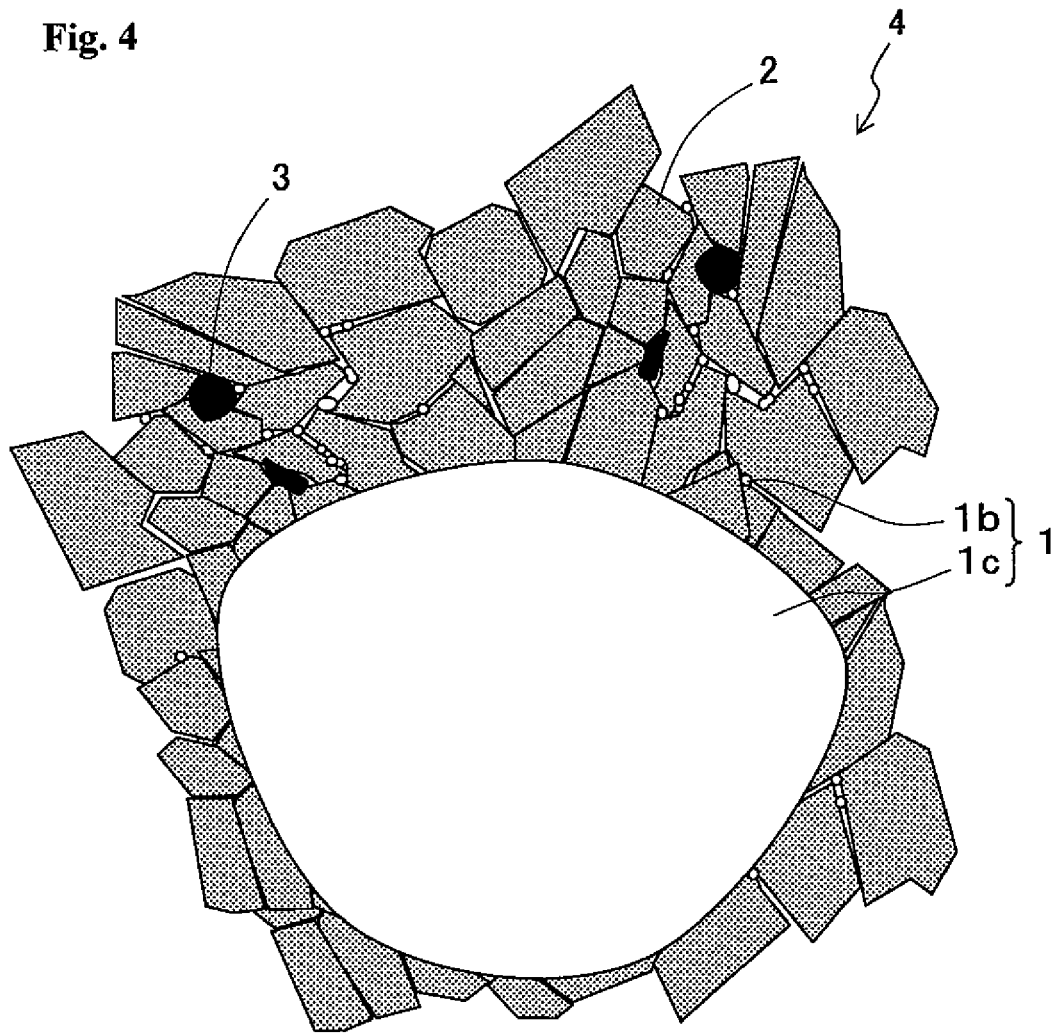
FIG. 4 is a sectional view schematically showing the crystal structure of a silicon carbide sintered body used in the sliding member of the preferred embodiment of the invention.

Especially, in the sliding member of the present preferred embodiment, at least the sliding surface is preferably made of a silicon carbide sintered body 4 shown in FIG. 4. The silicon carbide sintered body 4 has a main phase 2 whose main ingredient is silicon carbide, and a sub phase 3 having a different composition from the main phase 2 and containing at least boron, silicon and carbon. The sliding surface includes a plurality of the open pores 1 having one or more opening portions whose circularity is not less than 0.24 and circle equivalent diameter is not less than 10 µm nor more than 150 µm.

The open pores 1 include pores that remain along grain boundaries without being vanished during sintering process, namely, the remaining pores 1b, and pores that are generated in situations where the pore forming agent is burnt down or thermally decomposed by heating, namely, the burnt-down pores 1c. These two types of open pores 1b and 1c can be distinguished by the circle equivalent diameter of the opening portions thereof. That is, the remaining pores 1b are open pores whose circle equivalent diameter is less than 10 µm, and the burnt-down pores 1c are open pores whose circle equivalent diameter is not less than 10 µm.

The remaining pores 1b exert little or no influence on the sliding characteristics and sealing properties because their circle equivalent diameter are as small as less than 10 µm. On the other hand, the circle equivalent diameters of the burnt-down pores 1c are as large as not less than 10 µm, and therefore the shapes and distribution of the burnt-down pores 1c existing on the sliding surface exert considerable influence on the sliding characteristics and sealing properties of the sliding member. In the present preferred embodiment, the ratio of the number of the open pores, in which the degree of overlap between the opening portions is not less than 10%, is not more than 3% of a plurality of the open pores 1. It is therefore capable of reducing the influence of the shapes and distribution of the burnt-down pores 1c on the sliding characteristics and sealing properties of the sliding member.

Figure 5:
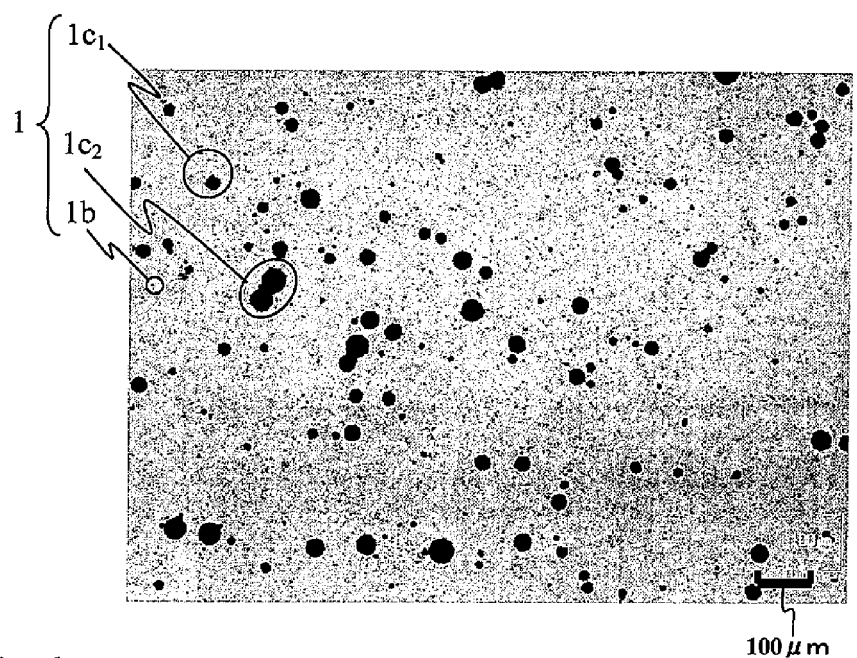
FIG. 5 is a micrograph showing open pores existing in the silicon carbide sintered body used in the sliding member of the preferred embodiment of the invention.
Figure 6:
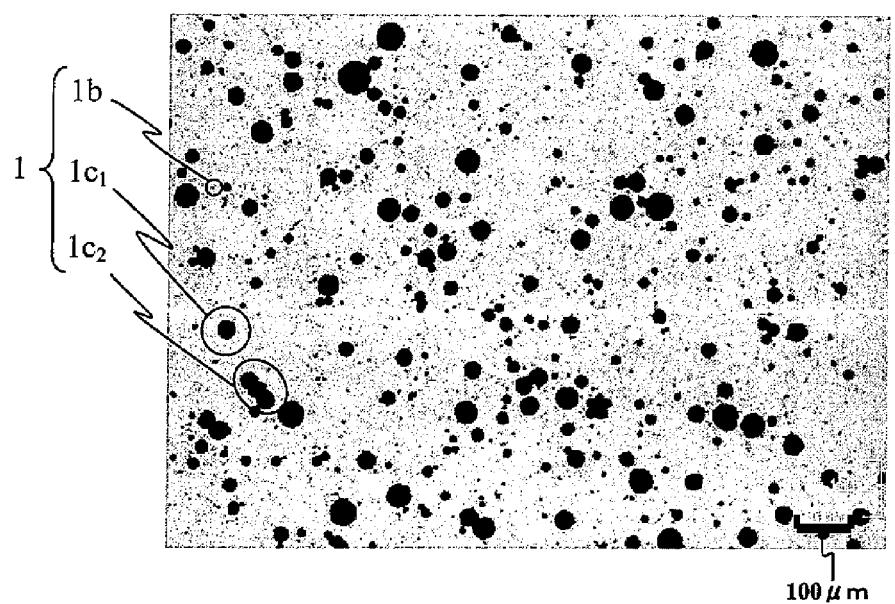
FIG. 6 is an another micrograph showing open pores existing in the silicon carbide sintered body used in the sliding member of the preferred embodiment of the invention.

The remaining pores 1b, the burnt-down pores 1$c_1$ existing solely, and the burnt-down pores 1$c_2$ in which the adjacent opening portions are overlapped with each other can be observed on micrographs as shown in FIGS. 5 and 6.

In the sub phase 3, the individual elements of boron, silicon and carbon normally exist solely, or silicon and boron combine together and exist as a silicide, such as $SiB_4$ and/or $SiB_6$, and/or silicon carbide. The sub phase 3 is also a granular phase existing only in a region surrounded by a plurality of main phases 2. When the sub phase 3 is a columnar phase or a needle-shaped phase extending over a plurality of main phases 2, the movement of phonons as the carrier of thermal conduction is under considerable restriction. In contrast, when the sub phases 3 are granular phases dotted among a plurality of main phases 2, the movement of phonons is under little or no restriction. This improves thermal conductivity and thermal shock resistance, so that the heat generation due to friction can be lowered to decrease the wear of the sliding surface.

In the silicon carbide sintered body 4, the ratio of the main phases 2 is preferably 99 to 99.8% by volume, and the ratio of the sub phases 3 is preferably 0.2 to 1% by volume. These ratios can be measured by using, for example, fluorescent X-ray analysis method, ICP (inductively coupled plasma) emission analysis method, or carbon analysis method.

Like the sliding surface, portions other than the sliding surface may be made up of a main phase whose main ingredient is silicon carbide, and a sub phase containing boron, silicon and carbon. Alternatively, the ingredients constituting the main phase and the sub phase may differ from each other.

In the sliding member having in the sliding surface a plurality of open pores having one or more opening portions whose circularity is 0.24 or more and circle equivalent diameter is not less than 10 µm nor more than 78 µm, relatively small opening portions exist in the sliding surface. This contributes to maintaining satisfactory sealing properties, namely, being free from leakage over a long-term continuous use.

Depending on the average value of the circle equivalent diameters, a variety of large and small opening portions exist over a wide range in the sliding surface by setting the coefficient of variation $\sqrt{V}/X$ (where $\sqrt{V}$ is a standard deviation of circle equivalent diameters, and X is an average value of the circle equivalent diameters) to not less than 1.03 nor more than 1.51. This makes it easy for wear particles generated from the abutting sliding members to selectively enter small opening portions, and makes it difficult for the wear particles to enter relatively large opening portions. Consequently, the large opening portions are capable of retaining the lubricating liquid over a long term, thus contributing to maintaining sliding characteristics.

The coefficient of variation $\sqrt{V}/X$ is more preferably is not less than 1.12 nor more than 1.21, thereby achieving a more suitable balance between the sealing properties and sliding characteristics in the sliding surface.

<Mechanical Seal Ring and Mechanical Seal>

Figure 7:
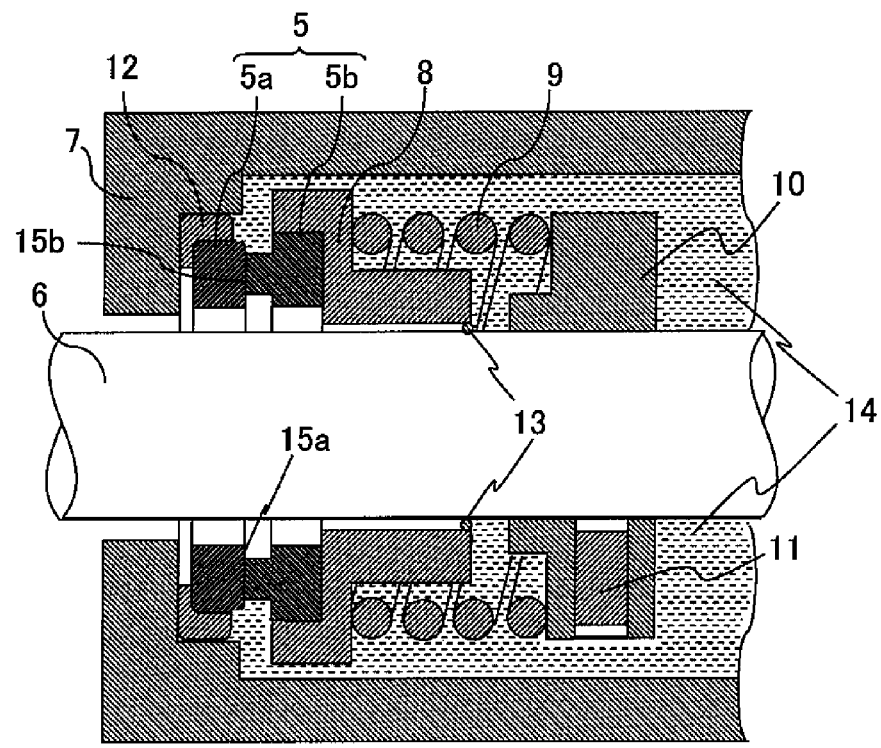
FIG. 7 is a partial sectional view showing an example of mechanical seals where the sliding member of the preferred embodiment of the invention is applied to a mechanical seal ring.
Figure 8:
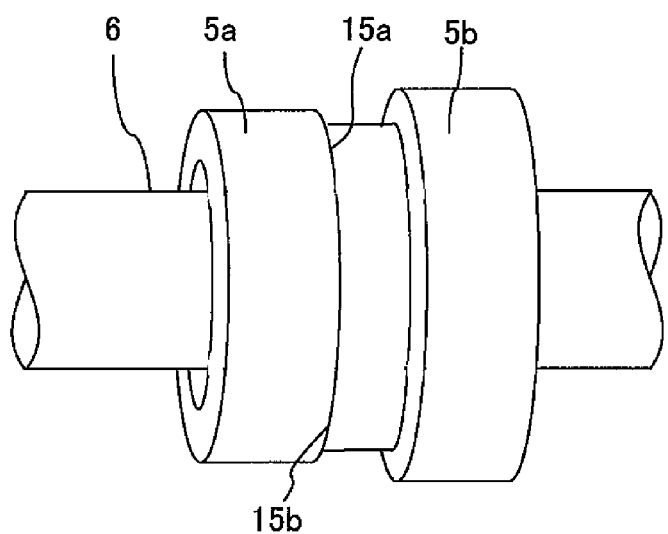
FIG. 8 is a perspective view showing an example of mechanical seal rings according to a preferred embodiment of the invention.

A preferred embodiment of the mechanical seal ring and the mechanical seal of the present invention will be described below in detail with reference to FIGS. 7 and 8. As shown in FIGS. 7 and 8, the mechanical seal of the present preferred embodiment is equipped with the mechanical seal ring 5, and a rotary shaft 6 that is inserted onto the inner peripheral side of the mechanical seal ring 5 and transmits a driving force.

That is, the mechanical seal is a device using the mechanical seal ring 5 that imparts sealing action by causing a sliding surface 15b of a rotary ring 5b as an annular body having a projected part to slide on a sliding surface 15a of a stationary ring 5a as an annular body. The mechanical seal ring 5 is fit between the rotary shaft 6 for transmitting the driving force from a driving mechanism (not shown), and a casing 7 for rotatably supporting the rotary shaft 6, and installed so that the sliding surfaces 15a and 15b of the stationary ring 5a and the rotary ring 5b form a vertical surface with respect to the rotary shaft 6, respectively.

The rotary ring 5b is cushioningly supported by a packing 8. A coil spring 9 wound around the rotary shaft 6 is arranged on the side of the packing 8 opposite the rotary ring 5b. By pressing the packing 8 with a preset springback force of the coil spring 9, the sliding surface 15b of the rotary ring 5b slides while being pressed against the sliding surface 15a of the stationary ring 5a. On the side opposite the side on which the coil spring 9 presses the packing 8, a collar 10 is fixed to the rotary shaft 6 by a set screw 11 and installed as the stopper of the coil spring 9.

On the other hand, the stationary ring 5a contacting the sliding surface 15b of the rotary ring 5b through the sliding surface 15a is supported by a cushion rubber 12. The cushion rubber 12 is fitted inside a casing 7 serving as the outer frame of the mechanical seal, thereby supporting the stationary ring 5a. The cushion rubber 12 and the packing 8 also have the function of absorbing vibrations generated by the rotation of the rotary shaft 6.

When the rotary shaft 6 rotates, the collar 10 rotates accordingly. Then, the packing 8 pressed by the springback force of the coil spring 9, and the sliding surface 15b of the rotary ring 5b supported by the packing 8 rotate while being pressed. This provides sealing action between the sliding surface 15b of the rotary ring 5b and the sliding surface 15a of the stationary ring 5a. When the above mechanical seal is fitted into fluid equipment (not shown), the mechanical seal is fitted into the mechanical seal ring 5 so that fluid equipment is arranged on the extension on the side on which the collar 10 is disposed.

Hereat, the fluid enters into the interior surrounded by the casing 7 of the mechanical seal. However, the sealing action of an O-ring 13 disposed between the packing 8 and the rotary shaft 6, and the sealing action of the sliding surfaces 15a and 15b of the mechanical seal ring 5 cooperate to avoid the fluid leakage from the mechanical seal to the exterior. Part of a sealed fluid 14 that is the fluid sealed by the mechanical seal enters into between the sliding surfaces 15a and 15b of the mechanical seal ring 5, and acts as a lubricating liquid.

The mechanical seal ring 5 is made up of the stationary ring 5a and the rotary ring 5b which cause mutual abutment and sliding between the sliding surfaces 15a and 15b through the lubricating liquid. At least one of the stationary ring 5a and the rotary ring 5b is formed by the sliding member of the present preferred embodiment. This achieves the mechanical seal ring having excellent sealing properties and the retainability of the lubricating liquid, as well as high long-term reliability.

In the mechanical seal of the present preferred embodiment, when the rotary ring 5b starts sliding, dynamic pressure due to air flow is firstly generated on the sliding surfaces 15a and 15b. Subsequently, at the opening portions, negative pressure lower than the dynamic pressure acts to the lubricating liquid retained within the open pores. Owing to the negative pressure generated on the opening portions, the lubricating liquid retained within the open pores can be suitably supplied to the sliding surfaces 15a and 15b. As described above, the mechanical seal of the present preferred embodiment uses the mechanical seal ring 5 having high long-term reliability.

Accordingly, the mechanical seal also has high long-term reliability similarly to the mechanical seal ring 5.

In the mechanical seals shown in FIGS. 7 and 8, the stationary ring 5a is the annular body, and the rotary ring 5b is the annular body having the projected part. Conversely, the stationary ring 5a may be the annular body having the projected part, and the rotary ring 5b may be the annular body.

<Faucet Valve>

Figure 9:
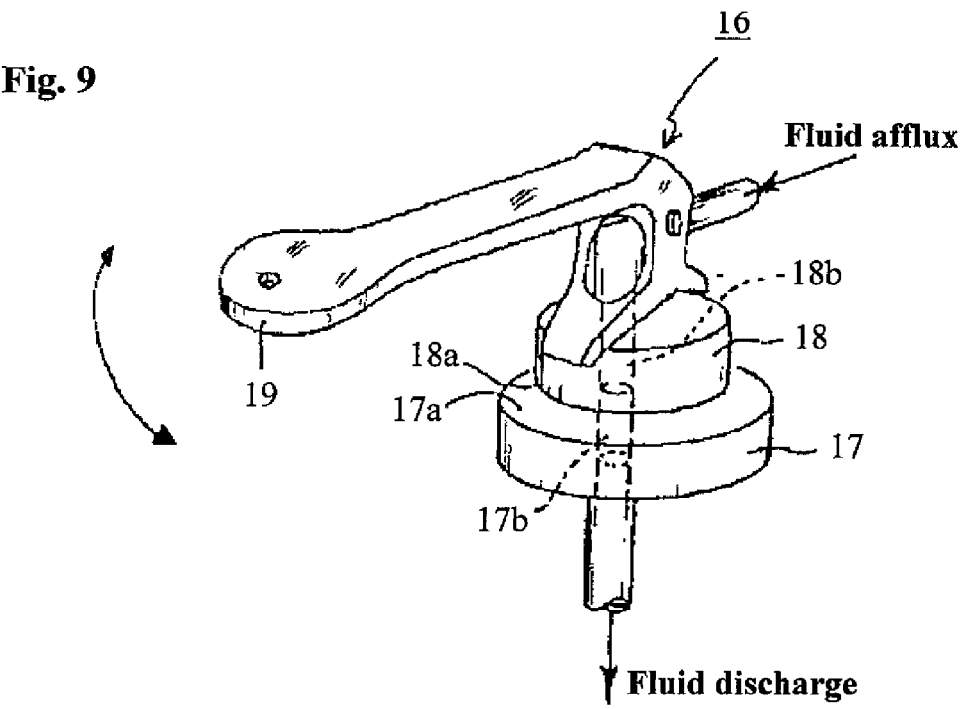
FIG. 9 is a perspective view showing an example where the sliding member of the preferred embodiment of the invention is applied to a faucet valve, and showing the state where a fluid passage is opened.
Figure 10:
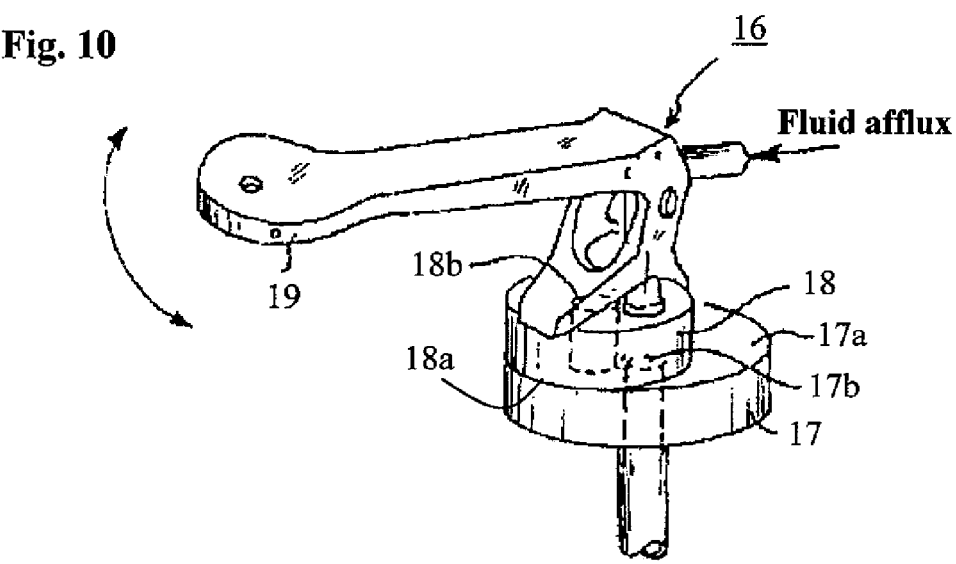
FIG. 10 is an another perspective view showing an example where the sliding member of the preferred embodiment of the invention is applied to the faucet valve, and showing the state where the fluid passage is closed.
Figure 11:
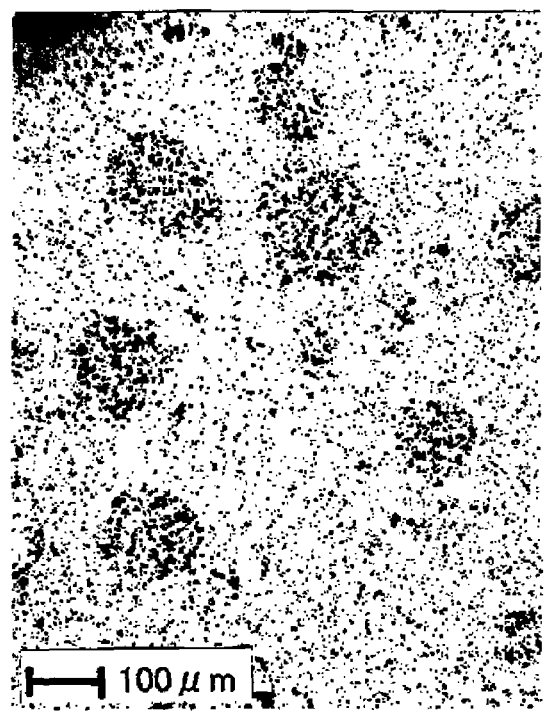
FIG. 11 is a micrograph showing pores existing in a conventional porous silicon carbide sintered body.
Figure 12:
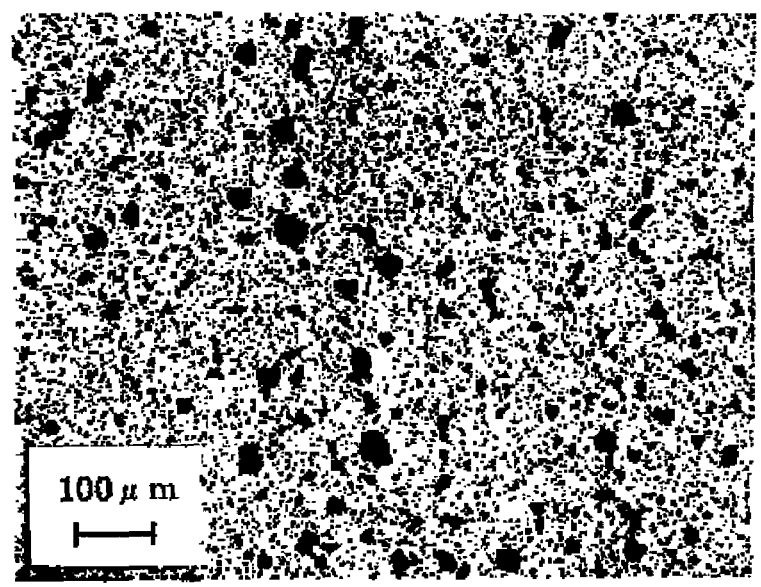
FIG. 12 is a micrograph showing pores existing in other conventional porous silicon carbide sintered body.

A preferred embodiment of the faucet valve of the present invention will be described below in detail with reference to FIGS. 9 and 10. As shown in FIGS. 9 and 10, the faucet valve 16 of the present preferred embodiment is equipped with a substrate-like stationary valve body 17 and a rotary valve body 18 which cause mutual abutment and sliding between sliding surfaces 17a and 17b through a lubricating liquid.

The stationary valve body 17 is fixed to a resin case (not shown). The movable valve body 18 is constructed to be movable in the interior of the resin case and on the stationary valve body 17. Fluid passages 17b and 18b are formed within the stationary valve body 17 and the movable valve body 18 in their thickness directions, respectively. Both of the fluid passages 17b and 18b are connected on the sliding surfaces 17a and 18a. A lever 19 is fixed to the movable valve body 18, and the movable valve body 18 is moved by moving the lever 19 upwardly and downwardly or in the direction of rotation.

As shown in FIG. 9, with the fluid passages 17b and 18b opened, fluid such as water or hot water flows sequentially from the direction indicated by the arrow into the fluid passages 17b and 18b, and the fluid is discharged from a faucet (not shown) connected to the faucet valve 16. At this time, the fluid entered between the sliding surfaces 17a and 18a becomes the lubricating liquid together with grease such as silicone grease previously applied to one of the sliding surfaces 17a and 18a, and acts to maintain sliding characteristics.

On the other hand, as shown in FIG. 10, the upward or downward movement of the movable valve body 18 through the lever 19 blocks the communication between the fluid passages 17b and 18b and restricts the discharge of the fluid from the faucet. The movement of the movable valve body 18 in the direction of rotation adjusts the area of an end face where the fluid passages 17a and 18b are connected to each other, thereby adjusting the flow rate of the fluid discharged from the faucet.

In the faucet valve 16 of the present preferred embodiment, at least one of the stationary valve body 17 and the rotary valve body 18 is formed by the sliding member having excellent sliding properties and excellent retainability of the lubricating liquid. Accordingly, the faucet valve 16 has high long-term reliability.

<Manufacturing Method>

A method of manufacturing the sliding member of the foregoing preferred embodiment will next be described. In order to obtain the sliding member of the present preferred embodiment, firstly, powder of ceramics, such as silicon carbide or aluminum oxide, a pore forming agent composed of resin beads, a pore dispersing agent for dispersing the pore forming agent, water, and a dispersing agent for dispersing the power of ceramics as needed are mixed by a ball mill or a bead mill to make slurry.

Subsequently, sintering additives and a binder as forming additives are added to the slurry and mixed together. Granules are obtained by spray-drying the mixture. As a result, the pore forming agent is incorporated into most of the obtained granules.

When the powder of the ceramics is silicon carbide, as the sintering additives, aluminum oxide powder and rare earth oxide powder such as yttria may be combined. Alternatively, boron carbide powder and carbon powder or phenol resin may be combined. When carbon is used as the ingredient of the sintering additives, the carbon becomes a free carbon and exists within the open pores. When the sliding members slide, the free carbon easily effuses onto the sliding surfaces and is then incorporated into the lubricating liquid. The incorporation of the free carbon into the lubricating liquid improves the sliding characteristics of the sliding member, thus being suitable for the mechanical seal ring and the faucet valve susceptible to abnormal sound and linking during the initial stage of sliding.

When the powder of the ceramics is aluminum oxide, the sintering additives is preferably at least one selected from silicon dioxide powder, magnesium oxide powder and calcium oxide powder.

The reason for using the pore dispersing agent is as follows. That is, in order to achieve the following arrangements: a plurality of open pores having one or more opening portions, whose circularity is 0.24 or more and circle equivalent diameter is not less than 10 μm nor more than 150 μm, exist in the sliding surfaces; and the ratio of the number of open pores having not less than 10% of the degree of overlap between the opening portions 1a is not more than 3%, it is preferable to use a pore forming agent having a roundness of not more than 4 μm and a maximum diameter of not less than 13 μm nor more than 60 μm. The roundness becomes smaller as it is closer to a perfect circle, and the roundness of the perfect circle is zero. The roundness is a value calculated from the following equation:

Roundness=(Maximum diameter−Minimum diameter)×½

The ratio of the pore forming agent is preferably not more than 0.3% by mass to 100% by mass of the total of the powder of ceramics as the main ingredient and the sintering additives and the forming additives.

The pore forming agent is usually hydrophobic and hence cannot be dispersed in slurry using water as solvent, thus being susceptible to aggregation. Consequently, on the sliding surfaces, opening portions might be connected to each other to generate a large opening portion. For the purpose of reducing the occurrence of this opening portion, a pore dispersing agent is preferably added. The added pore dispersing agent is adsorbed onto the pore forming agent. This allows the pore forming agent to easily wet and permeate into the slurry, thus being dispersed without being aggregated in the slurry.

The pore dispersing agent may be added at a ratio of not less than 0.13% by mass, preferably not less than 0.13% by mass nor more than 0.45% by mass to 100% by mass of the pore forming agent. Consequently, the pore forming agent can be easily dispersed irrespective of the type of the pore forming agent. As a result, after firing, a plurality of open pores having one or more opening portions, whose circularity is 0.24 or more and maximum circle equivalent diameter is not more than 150 μm, exist in the sliding surfaces, and the ratio of the number of open pores, in which the degree of overlap between the opening portions 1a is not less than 10%, to the plurality of open pores is not more than 3%. Further, the average value of the circle equivalent diameter of the opening portions can be controlled to not less than 20 μm nor more than 40 μm by setting the average diameter of the pore forming agent to not less than 35 μm nor more than 45 μm.

As the pore forming agent, it is preferable to use suspension-polymerized non-crosslinked resin beads formed from at least one of silicone beads, polystyrene and polyacrylstyrene. The compression strength of these resin beads is as low as not more than 1.2 MPa, and they are therefore easily plastically deformed in the pressing direction during the forming step, thereby reducing micro cracks that are liable to occur as elastic recovery proceeds. The pore forming agent is thermally decomposed or vanished to thereby form open pores capable of supplying the lubricating liquid onto the sliding surfaces.

Preferable examples of the pore dispersing agent include anionic interface activating agents such as carboxylic acid salt, sulfonic acid salt, sulfuric acid ester salt or phosphoric acid ester salt. The anionic interface activating agent is adsorbed onto the pore forming agent, so that the pore forming agent can easily wet and permeate into the slurry. The aggregation of the pore forming agent can be further reduced by the charge repulsion of hydrophilic groups contained in the anionic interface activating agent. Consequently, the pore forming agent can be sufficiently dispersed into the slurry without causing aggregation. The anionic interface activating agent is highly effective in allowing the pore forming agent to wet and permeate into the slurry.

In order to achieve the sliding surface including a plurality of open pores having one or more opening portions, whose circularity is 0.24 or more and circle equivalent diameter is not less than 10 μm nor more than 78 μm, and also achieve the coefficient of variation of the open portions satisfying the above specific equation, the compositions and the amounts of addition of the pore forming agent and the pore dispersing agent may be adjusted. Specifically, the pore forming agent preferably has a maximum diameter of not less than 30 μm nor more than 50 μm, an average diameter of not less than 5 μm nor more than 40 μm, and the amount of addition thereof is preferably approximately not less than 0.1% by mass nor more than 5.0% by mass. The pore dispersing agent is preferably added in the range of not less than 0.05% by mass nor more than 0.40% by mass to 100% by mass of the pore forming agent.

On the other hand, the granules as obtained above are charged into a predetermined forming die and formed at a forming pressure suitably selected from the range of 49 to 147 MPa, thereby obtaining a formed body.

When the main ingredient of the formed body is silicon carbide, the formed body is degreased in nitrogen atmosphere at a temperature of 450 to 650° C. for holding time of 2 to 10 hours, resulting in a degreased body. The degreased body is then put in a firing furnace and held in reduced pressure atmosphere of an inert gas at a temperature of 1800 to 2100° C. for holding time of 3 to 5 hours, followed by firing, resulting in a silicon carbide sintered body. Although no special limit is imposed on the inert gas, argon gas is suitably used because it is easy to purchase and handle.

When the main ingredient of the formed body is aluminum oxide, a formed body is fired in atmosphere at a temperature of 1500 to 1700° C., resulting in an aluminum oxide sintered body.

The pressed surface of the obtained sintered body (the sliding member) may be subjected to grinding, polishing or the like as needed. For example, the pressed surface is flattened with a double-head grinding machine or a surface grinding machine, and roughly machined with a lapping machine made of alumina by using diamond abrasive grains having a mean particle diameter of 3 μm. Thereafter, with a lapping machine made of tin by using diamond abrasive grains having a mean particle diameter of 1 to 3 μm, mirror-finishing may be carried out to have an arithmetic mean height Ra of not more than 0.98 μm. The reason why the arithmetic mean height Ra is set to not more than 0.98 μm is that sealing properties can be maintained.

The arithmetic mean height Ra may be measured according to JIS B 0601-2001. That is, the measuring length and the cut-off value are set at 5 mm and 0.8 mm, respectively. When the measurement is made by using a stylus surface roughness meter, a stylus having a distal end radius of 2 μm may be abutted against the sliding surface of the sliding member, and the scanning rate of the stylus may be set at 0.5 mm/sec.

The surface of the sintered body is thus ground to provide a mechanical seal ring. The above manufacturing method achieves inexpensive production of the sliding member such as the mechanical seal ring having excellent retainability of the lubricating liquid and capable of maintaining satisfactory sealing properties over a long-term continuous use.

Example 1

<Sample Production>

A predetermined amount of sintering additives and a predetermined amount of a pore forming agent were added to silicon carbide powder as a main ingredient. As the sintering additives, boron carbide powder and phenol resin were used. As the pore forming agent, suspension-polymerized non-crosslinked resin beads composed of polystyrene was used. The used pore forming agent had the maximum diameter and the roundness shown in Table 1. Further, as a pore dispersing agent, polycarboxylic acid sodium was added at the ratio shown in Table 1 with respect to 100% by mass of the pore forming agent, thereby obtaining a blend material.

The blend material was charged into a ball mill and mixed for 48 hours to make slurry. As forming additives, binder was added to the slurry and mixed together, followed by spray drying, thereby producing granules of silicon carbide having a mean particle diameter of 80 μm.

These granules were then charged into a forming die and press-formed at a pressure of 98 MPa in the thickness direction, thereby obtaining a ring-shaped formed body. The temperature of the obtained formed body was raised for 20 hours in nitrogen atmosphere and held at 600° C. for 5 hours and then spontaneously cooled and degreased, thereby obtaining a degreased body.

Subsequently, the degreased body was held at 2030° C. for 5 hours and then fired to obtain a ring-shaped silicon carbide sintered body. The surface of the individual silicon carbide sintered body was ground by a surface grinding machine and then machined by a lapping machine made of alumina using diamond abrasive grains having a mean grain diameter of 3 μm. Finally, the surface thereof was ground by a lapping machine made of tin using the diamond abrasive grains having a mean grain diameter of 3 μm so as to have an arithmetic mean height (Ra) of not more than 0.98 μm, thereby obtaining a sliding surface. Thus, Samples Nos. 1 to 23 were produced which were mechanical seal rings having an outer diameter of 25 mm and an inner diameter of 16 mm. All of these samples were the stationary rings 5a shown in FIGS. 7 and 8.

<Evaluations>

The circularity of the opening portions in the sliding surface, the maximum circle equivalent diameter of the opening portions, and the ratio of the number of the open pores were found by analyzing the sliding surface of each of the obtained samples at ×50 magnification with an industrial microscope.

Images were acquired with the industrial microscope by taking photographs of four regions, each of which was set to 2471 μm×1853 μm as a measuring area selected from the sliding surface. These images were then analyzed by using the image analysis software, "A-zo-kun" (Trademark) available from Asahi Kasei Engineering Corporation, and applying the technique of circular particle analysis. It was set so that the open pores having an circle equivalent diameter of less than 10 μm were previously removed from the object of analysis. The results are shown in Table 1. Among the columns of the number of ratio of open pores in Table 1, the columns having a horizontal line indicate those beyond the scope of calculation of the ratio of the number of open pores.

Thereafter, a rotary ring 5b with a projected part was prepared which was composed of carbon and had an outer diameter of 25 mm and an inner diameter of 16 mm. The rotary rings 5a and 5b were abutted on the sliding surfaces 15a and 15b and then slid under the following sliding conditions to measure the amount of leakage from the sliding surfaces 15a and 15b, indicating sealing properties, and measure the coefficient of friction indicating sliding characteristics. The results are shown in Table 1.

<Sliding Conditions>

Relative speed: 8 m/sec

Surface pressure: 500 kPa

Lubricating liquid: water

Sliding time: 100 hours

The relative speed is the rotation speed of the rotary ring 5b with respect to the stationary ring 5a at a position facing to the outer peripheral side with reference to the center of the rotary shaft, and being spaced therefrom by 11.25 mm (hereinafter referred to as position P). The surface pressure is the pressure per unit area of the rotary ring 5b with respect to the stationary ring 5a. The surface pressure is found by dividing a pressing force F preset for bringing the stationary ring 5a and the rotary ring 5b into mutual abutment, by the area of the sliding surface 15b of the rotary ring 5b. Using a metal microscope provided with a gauge for measuring dimension, the area was calculated by measuring the outer diameter and the inner diameter of the projected part of the rotary ring 5b at ×50 magnification with the gauge.

The coefficient of friction p was found as follows. Firstly, a rotation torque T at the position P of the rotary ring 5b during sliding was measured by a torque meter. The rotation torque T was then divided by the pressing force F obtained by multiplying the area of the sliding surface 15b by a surface pressure and the distance 11.25 mm from the center of the rotary shaft to the position P. That is, the coefficient of friction μ was calculated from the following equation:

$$\mu = T/(11.25 \times F)$$

TABLE 1

| | PFA | | PDA | | | EOC | | |
| --- | --- | --- | --- | --- | --- | --- | --- | --- |
| Sample No. | Max. diameter (μm) | Roundness | RTPFA (% by mass) | Circularity | MECD (μm) | ROOP (%) | AOL (cm$^3$) | COF |
| 1 | 43 | 4.1 | 0.1 | 0.21 | 100 | — | 100 | 0.1 |
| 2 | 47 | 8.6 | 0.18 | 0.13 | 98 | — | 95 | 0.1 |
| 3 | 45 | 2.5 | 0.06 | 0.42 | 150 | 4.0 | 202 | 0.08 |
| 4 | 40 | 3.5 | 0.02 | 0.36 | 150 | 10.1 | 250 | 0.06 |
| 5 | 43 | 4.2 | 0.15 | 0.23 | 110 | 2.4 | 100 | 0.1 |
| 6 | 51 | 3.1 | 0.09 | 0.48 | 151 | — | 131 | 0.07 |

TABLE 1-continued

| | PFA | | PDA | | | | EOC | |
|---|---|---|---|---|---|---|---|---|
| Sample No. | Max. diameter (μm) | Round-ness | RTPFA (% by mass) | Circu-larity | MECD (μm) | ROOP (%) | AOL (cm³) | COF |
| 7 | 48 | 2.8 | 0.13 | 0.67 | 150 | 2.5 | 88 | 0.04 |
| 8 | 41 | 3.1 | 0.22 | 0.33 | 78 | 1.9 | 80 | 0.05 |
| 9 | 39 | 3.8 | 0.2 | 0.24 | 81 | 2 | 82 | 0.07 |
| 10 | 41 | 2.7 | 0.21 | 0.55 | 75 | 1.8 | 87 | 0.05 |
| 11 | 40 | 1.1 | 0.14 | 0.89 | 102 | 2.6 | 97 | 0.01 |
| 12 | 45 | 1.2 | 0.19 | 0.88 | 95 | 2.1 | 89 | 0.01 |
| 13 | 42 | 2.7 | 0.24 | 0.41 | 86 | 1.4 | 65 | 0.05 |
| 14 | 48 | 1.8 | 0.29 | 0.85 | 80 | 1.1 | 60 | 0.02 |
| 15 | 40 | 3.4 | 0.17 | 0.32 | 88 | 2.1 | 91 | 0.07 |
| 16 | 44 | 3.6 | 0.15 | 0.26 | 82 | 2.4 | 93 | 0.08 |
| 17 | 46 | 1.7 | 0.16 | 0.78 | 94 | 3.0 | 98 | 0.03 |
| 18 | 43 | 2.5 | 0.32 | 0.58 | 90 | 0.8 | 15 | 0.04 |
| 19 | 44 | 1.4 | 0.3 | 0.88 | 77 | 0.9 | 25 | 0.01 |
| 20 | 38 | 2.4 | 0.34 | 0.58 | 67 | 0 | 8 | 0.05 |
| 21 | 44 | 2.7 | 0.29 | 0.4 | 82 | 0.8 | 27 | 0.06 |
| 22 | 43 | 2.1 | 0.38 | 0.66 | 78 | 0.6 | 30 | 0.03 |
| 23 | 45 | 3.2 | 0.28 | 0.32 | 86 | 0.8 | 19 | 0.07 |

Remarks:
PFA denotes pore forming agent;
PDA denotes pore dispersing agent;
RTPFA denotes ratio to pore forming agent;
MECD denotes maximum circle equivalent diameter;
ROOP denotes ratio of open pores;
EOC denotes evaluation of characteristics;
AOL denotes amount of leakage; and
COF denotes coefficient of friction.

The followings can be seen from Table 1. That is, in Samples Nos. 7 to 23 of the present preferred embodiment, the circularity of the opening portions in the sliding surfaces is not less than 0.24, so that their respective coefficients of friction are lower than Samples Nos. 1, 2 and 5 in which the circularity of the opening portions is less than 0.24. Namely, their respective values are as low as less than 0.1.

Additionally, in Samples Nos. 7 to 23 of the present preferred embodiment, the ratio of the number of open pores is not more than 3%, so that the amount of leakage occurred between the sliding surfaces 15a and 15b is as small as less than 100 cm³ than that of Sample No. 6 including the opening portions whose maximum circle equivalent diameter exceeds 150 μm, and than those of Samples Nos. 3 and 4 in which the ratio of the number of open pores exceeds 3%. That is, Samples Nos. 7 to 23 have high sealing properties.

Especially, in Samples Nos. 18 to 23, the ratio of the number of open pores is not more than 1.0%, so that the amount of leakage is not more than 30 cm³, thereby achieving higher sealing properties.

Example 2

<Sample Production>
A blend material was obtained in the same manner as in Example 1. However, the pore forming agent had the average diameter shown in Table 2, and the roundness thereof was not more than 4 μm.

The blend material was charged into a ball mill and mixed for 48 hours to make slurry. As forming additives, binder was added to the slurry and mixed together, followed by spray drying, thereby producing granules of silicon carbide having a mean particle diameter of 80 μm.

These granules were then charged into a forming die and press-formed at a pressure of 98 MPa in the thickness direction, thereby obtaining a ring-shaped formed body. The temperature of the obtained formed body was raised for 20 hours in nitrogen atmosphere and held at 600° C. for 5 hours and then spontaneously cooled and degreased, thereby obtaining a degreased body.

Subsequently, the degreased body was held at 2030° C. for 5 hours and then fired to obtain a ring-shaped silicon carbide sintered body. The surface of the individual silicon carbide sintered body was ground by a surface grinding machine and then machined by a lapping machine made of alumina using diamond abrasive grains having a mean grain diameter of 3 μm. Finally, the surface thereof was ground by a lapping machine made of tin using the diamond abrasive grains having a mean grain diameter of 3 μm so as to have an arithmetic mean height (Ra) of not more than 0.98 μm, thereby obtaining a sliding surface. Thus, Samples Nos. 24 to 28 were produced which were mechanical seal rings having an outer diameter of 25 mm and an inner diameter of 16 mm. All of these samples were the stationary rings 5a shown in FIGS. 7 and 8.

<Evaluations>
The average value of the circle equivalent diameters of opening portions in the sliding surface in which the circularity was not less than 0.24 and the maximum circle equivalent diameter was not less than 150 μm, and the ratio of the number of open pores were found by analyzing the sliding surface of each of the obtained samples at ×50 magnification with the industrial microscope.

The average value of the circle equivalent diameters of opening portions in the sliding surface in which the circularity was not less than 0.24 and the maximum circle equivalent diameter was not less than 150 μm, and the ratio of the number of open pores were found in the same manner as in Example 1. It was set so that the open pores having an circle equivalent diameter of less than 10 μm were previously removed from the object of analysis. The results are shown in Table 2.

Thereafter, a rotary ring 5b with a projected part was prepared which was composed of carbon and had an outer diameter of 25 mm and an inner diameter of 16 mm. The rotary rings 5a and 5b were abutted on the sliding surfaces 15a and 15b and then slid under the same sliding conditions as Example 1, and the amount of leakage from the sliding surfaces 15a and 15b, indicating sealing properties, and the coefficient of friction indicating sliding characteristics were measured in the same manner as Example 1. The results are shown in Table 2.

TABLE 2

| Sample No. | Pore forming agent Average diameter (μm) | Average value of circle equivalent diameter (μm) | Ratio of open pores (%) | Evaluation of Characteristics Amount of leakage | Coefficient of friction |
|---|---|---|---|---|---|
| 24 | 30 | 18 | 0.7 | 25 | 0.07 |
| 25 | 50 | 42 | 1.4 | 96 | 0.02 |
| 26 | 35 | 20 | 0.9 | 7 | 0.03 |
| 27 | 40 | 24 | 1.0 | 12 | 0.02 |
| 28 | 45 | 40 | 1.3 | 13 | 0.03 |

The followings can be seen from Table 2. That is, in Samples Nos. 26 to 28, the average value of the circle equivalent diameters of opening portions in the sliding surfaces is not less than 20 μm nor more than 40 μm, so that the coefficient of friction is lower than Sample No. 24 in which the average value of the circle equivalent diameters of opening portions is less than 20 μm. Namely, their respective values are as low as not more than 0.03.

Additionally, in Samples Nos. 26 to 28, the amount of leakage occurred between the sliding surfaces 15a and 15b is smaller than that of Sample No. 25 in which the average value of the circle equivalent diameters of opening portions exceeds 40 μm. That is, their respective values are not more than 13 cm³.

It can be seen from the foregoing results that the sliding member in which the average value of the circle equivalent diameters of opening portions is 20 μm nor more than 40 μm has both of high sealing properties and high retainability of the lubricating liquid. Further, the ratios of the number of open pores of Samples Nos. 24 to 28 were measured in the same manner as in Example 1, and their respective values were not more than 3%.

Example 3

<Sample Production>

A blend material was obtained in the same manner as in Example 1. As the pore forming agent, those having the maximum diameter and the average diameter and the amount of addition as shown in Table 3 were used.

Granules of silicon carbide was produced in the same manner as in Example 1, a degreased body was fired to obtain a ring-shaped silicon carbide sintered body.

Thereafter, the sintered body was ground in the same manner as in Example 1, thereby obtaining Samples Nos. 29 to 31 as a mechanical seal ring having an outer diameter of 25 mm and an inner diameter of 16 mm. The individual samples were the stationary ring 5a shown in FIG. 7. The porosities of these samples were found according to Archimedean method, and their respective values were 3 to 8%.

<Evaluations>

The maximum value, the average value and the standard deviation of the circle equivalent diameters of opening portions were found by observing and analyzing the sliding surface of each sample with the microscope in the same manner as in Example 1. The coefficient of variation calculated from the average value and the standard deviation of the circle equivalent diameters were shown in Table 3. It was set so that the open pores having an circle equivalent diameter of less than 10 μm were previously removed from the object of analysis.

Thereafter, a rotary ring 5b with a projected part was prepared which was composed of carbon and had and outer diameter of 25 mm and an inner diameter of 16 mm. The rotary rings 5a and 5b were abutted on the sliding surfaces 15a and 15b and then slid under the following sliding conditions. The amount of leakage from the sliding surfaces 15a and 15b, indicating sealing properties, and the coefficient of friction indicating sliding characteristics were measured in the same manner as in Example 1. The results are shown in Table 3.

<Sliding Conditions>

Relative speed: 8 m/sec
Surface pressure: 400 kPa
Lubricating liquid: water
Sliding time: 150 hours

TABLE 3

| | PFA | | | PDA | ECDOOP | | | | EOC | | |
|---|---|---|---|---|---|---|---|---|---|---|---|
| SN | MD (μm) | AD (μm) | AOA (% by mass) | RTPFA (%) | MV (μm) | AV (μm) | SD (μm) | COV | AOL (cm³) | COF | C |
| 29 | 41 | 13 | 1.0 | 0.10 | 75 | 33 | 37 | 1.13 | 68 | 0.04 | 0.41 |
| 30 | 48 | 35 | 1.0 | 0.31 | 68 | 30 | 33 | 1.09 | 25 | 0.02 | 0.44 |
| 31 | 42 | 16 | 4.5 | 0.18 | 78 | 15 | 23 | 1.51 | 25 | 0.03 | 0.32 |

Remarks:
SN denotes sample number;
PFA denotes pore forming agent;
MD denotes maximum diameter;
AD denotes average diameter;
AOA denotes amount of addition;
PDA denotes pore dispersing agent;
RTPFA denotes ratio to pore forming agent;
ECDOOP denotes circle equivalent diameter of opening portions;
MV denotes maximum value;
AV denotes average value;
SD denotes standard deviation;
COV denotes coefficient of variation;
EOC denotes evaluation of characteristics;
AOL denotes amount of leakage;
COF denotes coefficient of friction; and
C denotes circularity.

Although not shown in Table 3, the sample in which the maximum value of the circle equivalent diameter of opening portions in the sliding surface 15a exceeded 78 μm, and the sample in which the coefficient of variation $\sqrt{V}/X$ of the opening portions exceeded 1.51 caused a large amount of leakage occurred between the sliding surfaces 15a and 15b. The sample in which the coefficient of variation $\sqrt{V}/X$ of the opening portions was less than 1.03 had a high coefficient of friction.

The followings can be seen from Table 3. That is, in Samples Nos. 29 to 31 shown in Table 3, the maximum value of the circle equivalent diameters of the opening portions in the sliding surface 15a is not more than 78 μm, and the coefficient of variation $\sqrt{V}/X$ of the opening portions is not less than 1.03 nor more than 1.51. Therefore, relatively small opening portions exist in the sliding surface 15a, so that the amount of leakage occurred between the sliding surfaces 15a and 15b is small and sealing properties is high. A variety of large and small opening portions exist over a wide range in the sliding surface 15a, and the worn powder generated from the abutting rotary ring 5b is liable to selectively enter small opening portions, and the worn powder is less liable to enter relatively large opening portions. Hence, the lubricating liquid can be retained in the large opening portions for a long period of time, thereby achieving a low coefficient of friction.

Especially, in Samples Nos. 30 and 31, the average value of the circle equivalent diameters of opening portions was not more than 30 μm, so that the ratio of extremely large opening portions is small. Therefore, the amount of leakage occurred between the sliding surfaces 15a and 15b is small, thus achieving high sealing properties.

In Sample No. 31, the average value of the circle equivalent diameters is not less than 4 μm nor more than 15 μm, so that the amount of leakage is not more than 25 cm$^3$ and the coefficient of friction is not more than 0.04, thus achieving higher sealing properties and higher retainability of the lubricating liquid.

The ratios of the number of open pores of Samples Nos. 29 to 31 were measured in the same manner as in Example 1, and their respective values were not more than 3%.

The invention claimed is:

1. A sliding member, comprising:
   a plurality of open pores in a sliding surface which each comprises one or more opening portions having a circularity of 0.24 or more and a circle equivalent diameter of 10 μm to 150 μm,
   wherein a ratio of a number of open pores having the overlapping degree of 10% or more between the opening portions is 3% or less.

2. The sliding member according to claim 1 wherein an average value of the circle equivalent diameters of the opening portions is 20 μm to 40 μm.

3. The sliding member according to claim 1, wherein a coefficient of variation of the opening portions satisfies the following equation:

$$1.03 \leq \sqrt{V}/X \leq 1.51$$

where $\sqrt{V}$ is a standard deviation of circle equivalent diameters, and X is an average value of the circle equivalent diameters.

4. The sliding member according to claim 1, wherein the sliding surface is composed of aluminum oxide or silicon carbide.

5. A mechanical seal ring, comprising:
   a stationary ring; and
   a rotary ring,
   wherein a sliding surface of the stationary ring and a sliding surface of the rotary ring are mutually contacted, and
   wherein at least one of the stationary ring and the rotary ring comprises the sliding member according to claim 1.

6. A mechanical seal, comprising:
   the mechanical seal ring according to claim 5; and
   a rotary shaft that is inserted into an inner peripheral side of the mechanical seal ring and is configured to transmit a driving force.

7. A faucet valve, comprising:
   a stationary valve body; and
   a rotary valve body,
   wherein a sliding surface of the stationary valve body and a sliding surface of the rotary valve body are mutually contacted, and
   wherein at least one of the stationary valve body and the rotary valve body comprises the sliding member according to claim 1.

* * * * *